(12) United States Patent
Goto et al.

(10) Patent No.: US 7,247,197 B2
(45) Date of Patent: Jul. 24, 2007

(54) WATER BASE INK FOR INK-JET RECORDING AND METHOD FOR PREPARING WATER BASE INK FOR INK-JET RECORDING

(75) Inventors: Kazuma Goto, Nagoya (JP); Hideo Ohira, Tajimi (JP); Yoshito Toyoda, Nagoya (JP); Mayuko Okada, Toyota (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 294 days.

(21) Appl. No.: 10/668,078

(22) Filed: Sep. 22, 2003

(65) Prior Publication Data
US 2004/0130607 A1   Jul. 8, 2004

(30) Foreign Application Priority Data
Sep. 25, 2002   (JP)   ............................. 2002-279783

(51) Int. Cl.
*C09D 11/02*   (2006.01)
(52) U.S. Cl. .............................. 106/31.59; 106/31.89; 106/31.58; 106/31.86
(58) Field of Classification Search ............. 106/31.59, 106/31.89, 31.58, 31.86
See application file for complete search history.

(56) References Cited
U.S. PATENT DOCUMENTS 6,695,900 B2 * 2/2004 Momose .................. 106/31.75
6,749,675 B2 * 6/2004 Momose .................. 106/31.58
6,758,889 B2 * 7/2004 Koga et al. .............. 106/31.43
2002/0038614 A1 * 4/2002 Momose .................. 106/31.75

FOREIGN PATENT DOCUMENTS

| EP | 0 924 272 | 6/1999 |
|----|-----------|--------|
| JP | 11-263930 | 9/1999 |

OTHER PUBLICATIONS

Machine Translation of JP 10-140065, May 1998.*

* cited by examiner

*Primary Examiner*—J. A. Lorengo
*Assistant Examiner*—Veronica Faison-Gee
(74) *Attorney, Agent, or Firm*—Reed Smith LLP

(57) ABSTRACT

A water base ink for ink-jet recording is provided, which is excellent in time-dependent stability of ink characteristics, which can be stably jetted over a long period of time, and which makes it possible to perform the high quality recording. The water base ink for ink-jet recording contains a self-dispersing type water-insoluble particulate coloring agent, a compound represented by the following formula (1), a surfactant having a nitrogen atom in a molecule, water, and a water-soluble organic solvent, wherein a surface tension is 30 to 50 mN/m, and a ratio of change of the surface tension after storage at 60° C. for 2 weeks is less than 5%:

$$R^1-O-(CH_2CH_2O)_x-SO_3Na \qquad (1)$$

wherein $R^1$ represents an alkyl group and x is 20 to 30 in the formula (1).

12 Claims, 1 Drawing Sheet

WATER BASE INK FOR INK-JET RECORDING AND METHOD FOR PREPARING WATER BASE INK FOR INK-JET RECORDING

BACKGROUND OF THE INVENTION

1. Field of the Invention

The present invention relates to a water base ink for ink-jet recording to be used for an ink-jet recording apparatus, and a method for preparing the water base ink for ink-jet recording.

2. Description of the Related Art

The printer technique based on the ink-jet recording system is a printing technique based on, for example, the bubble method in which the ink is discharged from minute nozzles by using bubbles generated by the rapid heating, or the piezoelectric method in which the ink is discharged from minute nozzles by using a piezoelectric element that is deformable when a voltage is applied. In this technique, the inks of several colors, which serve as the basic colors, are converted into minute liquid droplets of several picoliters to several tens picoliters, and they are selectively landed on the paper surface to form an image thereby.

Those known as the water base ink for ink-jet recording to be used for the ink-jet recording system as described above include those in which a water-soluble dye or a water-insoluble particulate coloring agent is dissolved or dispersed in a liquid medium composed of water and a water-soluble organic solvent. In recent years, it is demanded that a high printing quality, in which the contour of the image is sharp, is realized on many types of paper. Therefore, a water base ink for ink-jet recording is almost dominantly adopted, which is based on the use of the water-insoluble particulate coloring agent such as the pigment to successfully reduce the blurring owing to the coloring agent component remaining on the paper surface. In particular, as for the water-insoluble particulate coloring agent, those of the self-dispersing type, in which a surface treatment is applied so that the coloring agent is capable of being dispersed in water, are dominantly adopted.

A preparation method, which is called "letdown", is generally adopted as a method for preparing the water base ink for ink-jet recording obtained by dispersing the water-insoluble particulate coloring agent as the coloring agent as described above. In this method, a preparation liquid is manufactured such that an aqueous coloring agent solution obtained by dispersing the water-insoluble particulate coloring agent is diluted with water so that the concentration of the water-insoluble particulate coloring agent is suitable for a desired coloring density. The other constitutive materials for the ink are added at appropriate timings to the preparation liquid while gently or slowly agitating the preparation liquid. According to the letdown method, it is possible to prepare the ink while maintaining the dispersion stability of the particulate coloring agent.

The water base ink for ink-jet recording is required to have the performance characteristics which are most appropriate to be used for the ink-jet recording system, in addition to the successful achievement of the high printing quality in which the contour of the image is sharp. For example, the following features are required. That is, there is no deterioration of the printing quality (hereinafter referred to as "bleeding" as well) which is caused by the mixing of the inks with each other at portions (hereinafter referred to as "boundary portions" as well) at which the inks having different colors are disposed adjacently when an image is formed on recording paper. The ink is dried quickly when an image is formed on recording paper, and the rub resistance is satisfactory. The ink is stable without causing any change of, for example, the characteristics and the physical properties of the ink over a long period of time. The ink does not corrode resin materials and metal materials which are used for the ink-jet head, and the stable jetting operation can be performed over a long period of time without causing any clog-up at the nozzle. In order to satisfy the performance characteristics as described above, a surfactant has been hitherto added to the ink for ink-jet recording. For example, Japanese Patent Application Laid-open No. 11-263930 discloses an ink for ink-jet recording based on the use of an amine oxide type surfactant in order that the recording on recording paper is performed at a uniform density and any uneven printing is reduced.

However, when the surfactant is added to the ink for ink-jet recording based on the use of the water-insoluble particulate coloring agent, the following problem has arisen. That is, when the ink is stored for a long period of time, then the surfactant is adsorbed to the water-insoluble particulate coloring agent, and the effect to reduce, for example, the uneven printing is declined or lost.

SUMMARY OF THE INVENTION

The present invention has been made in order to solve the problem as described above, an object of which is to provide a water base ink for ink-jet recording which is excellent in time-dependent stability of ink characteristics, which can be stably jetted over a long period of time, and which makes it possible to perform the high quality recording. Another object of the invention is to provide an ink cartridge accommodating the ink of the invention.

According to the present invention, there is provided a water base ink for ink-jet recording comprising:

water;

a water-soluble organic solvent;

a self-dispersing type water-insoluble particulate coloring agent;

a compound which is represented by the following formula (1);

$$R^1\text{—}O\text{—}(CH_2CH_2O)_x\text{—}SO_3Na \qquad (1)$$

wherein $R^1$ represents an alkyl group and x is 20 to 30 in the formula (1); and a surfactant which has a nitrogen atom in a molecule.

In the water base ink for ink-jet recording of the present invention, a surface tension may be 30 to 50 mN/m, and a ratio of change of the surface tension after storage at 60° C. for 2 weeks may be less than 5%.

According to the present invention, there is also provided an ink cartridge which accommodates the water base ink for ink-jet recording described above. The ink cartridge may be of a type capable of being detachably attached to an ink head, or of a type capable of being detachably attached to a frame of an ink-jet printer. In the case of the latter, the ink is supplied from the ink cartridge to a printing head via a flexible ink tube.

DESCRIPTION OF THE PREFERRED EMBODIMENTS

Figure 1:
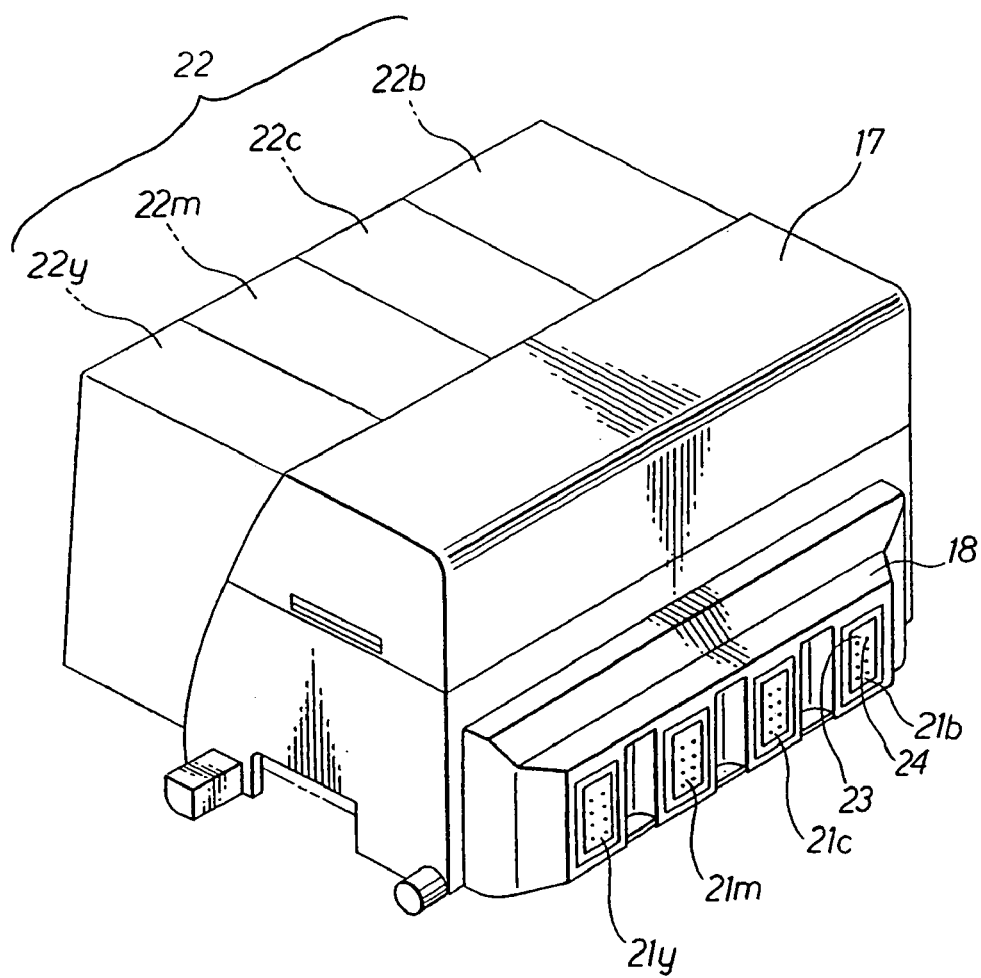
FIG. 1 shows an ink jet head which ejects four color inks and is provided with a color ink cartridge which contains the ink in accordance with the invention.

The water base ink for ink-jet recording of the present invention contains the self-dispersing type water-insoluble particulate coloring agent. The self-dispersing type water-insoluble particulate coloring agent plays a role of the coloring agent. The self-dispersing type water-insoluble particulate coloring agent is not specifically limited provided that the particulate coloring agent is dispersible in the aqueous phase. The self-dispersing type water-insoluble particulate coloring agent includes, for example, those in which a surface treatment to add the self-dispersing performance is applied to water-insoluble particulate coloring agents such as carbon black, organic pigments, inorganic pigments, and coloring agents obtained by staining polymer with dye.

The organic pigment is not specifically limited, which may include, for example, azo pigments such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as basic dye type lake and acidic dye type lake; nitro pigments; nitroso pigments; and aniline black daylight fluorescent pigments. The inorganic pigment is not specifically limited, which may include, for example, titanium oxide and iron oxide pigment. The self-dispersing type water-insoluble particulate coloring agent as described above may be used singly. Alternatively, two or more of the self-dispersing type water-insoluble particulate coloring agents as described above may be used in combination.

It is preferable that the blending amount of the self-dispersing type water-insoluble particulate coloring agent is 0.1 to 20% by weight with respect to the total amount of the water base ink for ink-jet recording of the present invention. If the blending amount is less than 0.1% by weight, it is impossible to obtain any sufficient printing density in some cases. If the blending amount exceeds 20% by weight, the dispersion stability is deteriorated. The blending amount is more preferably 0.3 to 15% by weight and much more preferably 0.5 to 10% by weight.

The water base ink for ink-jet recording of the present invention contains the compound which is represented by the following formula (1). The compound represented by the following formula (1) has the hydrophobic portion which is considered to be adsorbed to the surface of the water-insoluble particulate coloring agent in the water base ink for ink-jet recording of the present invention. Therefore, the surface of the particulate coloring agent is coated with the compound to improve the dispersion stability of the particulate coloring agent in the ink. Therefore, the surfactant which has the nitrogen atom as described later on is prevented from any adsorption to the particulate coloring agent. Accordingly, the water base ink for ink-jet recording of the present invention has the excellent time-dependent stability of the ink characteristics.

$$R^1-O-(CH_2CH_2O)_x-SO_3Na \quad (1)$$

In the formula (1), $R^1$ represents an alkyl group and x is 20 to 30. When x is 20 to 30, the molecular weight is appropriate to coat or cover the surface of the particulate coloring agent. It is possible to enhance the time-dependent stability of the water base ink for ink-jet recording of the present invention.

The compound represented by the formula (1) is not specifically limited, which may include, for example, sodium polyoxyethylene oleyl ether sulfate. In particular, those commercially available may include, for example, LEVENOL WX (x=25) and LATEMUL WX (x=23) (produced by Kao Corporation).

It is preferable that the blending amount of the compound represented by the formula (1) is 0.01 to 5% by weight with respect to the total amount of the water base ink for ink-jet recording of the present invention. If the blending amount is less than 0.01% by weight, then it is impossible to sufficiently coat the surface of the particulate coloring agent, and it is impossible to obtain any sufficient time-dependent stability in some cases. If the blending amount exceeds 5% by weight, the dispersion stability of the particulate coloring agent is deteriorated in some cases. The blending amount is more preferably 0.1 to 3% by weight and much more preferably 0.5 to 1% by weight.

The water base ink for ink-jet recording of the present invention contains the surfactant which has the nitrogen atom in the molecule. The surfactant which has the nitrogen atom in the molecule has, for example, the effect to adjust the surface tension of the water base ink for ink-jet recording of the present invention.

The surfactant which has the nitrogen atom in the molecule is not specifically limited. However, for example, a surfactant represented by the following formula (2) and a surfactant represented by the following formula (3) are preferably used. Each of the surfactants exhibits an appropriate surface-activating action, which can give the necessary permeability to the water base ink for ink-jet recording of the present invention. Further, each of the surfactants improves the printing quality. In particular, it is possible to obtain an image having a sharp edge. The surfactant which has the nitrogen atom in the molecule may be used singly. Alternatively, two or more of the surfactants each of which has the nitrogen atom in the molecule may be used in combination.

In the formula (2), $R^2$ represents an alkyl group and y+z is 5 to 15. When y+z is 5 to 15, then an appropriate surface-activating action is exhibited, and it is possible to give the necessary permeability to the water base ink for ink-jet recording of the present invention.

In the formula (3), $R^3$ represents an alkyl group and N→O represents a semipolar bond of amine oxide.

The surfactant represented by the formula (2) is not specifically limited, which may include, for example, polyoxyethylene alkylamine such as polyoxyethylene oleylamine and polyoxyethylene laurylamine. In particular, those commercially available may include, for example, ETHOMEEN C/15 (y+z=5), ETHOMEEN C/20 (y+z=10), ETHOMEEN C/25 (y+z=15), ETHOMEEN S/15 (y+z=5), ETHOMEEN S/20 (y+z=10), ETHOMEEN S/25 (y+z=15), ETHOMEEN T/15 (y+z=5), ETHOMEEN T/20 (y+z=10), and ETHOMEEN T/25 (y+z=15) (produced by Lion Akzo Co., Ltd.).

The surfactant represented by the formula (3) is not specifically limited, which may include, for example, alkyl dimethylamine oxide such as lauryl dimethylamine oxide, myristyl dimethylamine oxide, and coconut oil dimethylamine oxide. In particular, those commercially available may include, for example, Aromox DMC-W, Aromox DM12D-W(C), and Aromox DM14D-N (produced by Lion Akzo Co., Ltd.).

It is preferable that the blending amount of the surfactant which has the nitrogen atom in the molecule is 0.01 to 10% by weight with respect to the total amount of the water base ink for ink-jet recording of the present invention. If the blending amount is less than 0.01% by weight, then it is impossible to adjust the surface tension of the water base ink for ink-jet recording of the present invention to be within an appropriate range, and it is impossible to obtain any sufficient permeating action into the recording objective material such as recording paper in some cases. If the blending amount exceeds 10% by weight, then it is impossible to adjust the surface tension of the water base ink for ink-jet recording of the present invention to be within an appropriate range, and it is difficult to maintain the performance of introduction into the discharge head and the discharge stability in some cases. More preferably, the blending amount is 0.1 to 3% by weight.

The water base ink for ink-jet recording of the present invention contains water. The water is not specifically limited. However, it is preferable to use deionized water and pure water. It is preferable that the blending amount of the water is not less than 40% by weight with respect to the total amount of the water base ink for ink-jet recording of the present invention. If the blending amount is less than 40% by weight, it is difficult to maintain the viscosity of the ink in the normal state to be a low viscosity at which the jetting operation can be normally performed.

The water base ink for ink-jet recording of the present invention contains the water-soluble organic solvent. The water-soluble organic solvent is used principally in order to avoid any drying-up and any occurrence of deposition from the water base ink for ink-jet recording of the present invention at the tip of the ink-jet head. The water-soluble organic solvent is not specifically limited. However, it is preferable to use those which have the low volatility and which have the high dye-dissolving ability. There may be exemplified, for example, polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The water-soluble organic solvent as described above may be used singly. Alternatively, two or more of the water-soluble organic solvents as described above may be used in combination.

It is preferable that the blending amount of the water-soluble organic solvent is 5 to 40% by weight with respect to the total amount of the water base ink for ink-jet recording of the present invention. If the blending amount is less than 5% by weight, then the moistening action is insufficient, and problems including, for example, the deposition and the drying-up are caused in some cases. If the blending amount exceeds 40% by weight, the following problems arise in some cases. That is, the viscosity of the water base ink for ink-jet recording of the present invention is unnecessarily increased, and it is impossible to perform the discharge operation. Further, the ink is dried extremely slowly on the recording paper. The blending amount is more preferably 7 to 40% by weight and much more preferably 10 to 30% by weight.

It is allowable that the water base ink for ink-jet recording of the present invention further contains, for example, known permeating agents, resin binders, dispersing agents, surfactants, viscosity-adjusting agents, surface tension-adjusting agents, pH-adjusting agents, dye-dissolving agents, antiseptic/fungicidal agents, and rustproofing agents, if necessary. It is also allowable to contain monovalent alcohols such as ethanol and isopropyl alcohol in order to control the drying performance and the permeability of the water base ink for ink-jet recording of the present invention on the recording paper.

The permeating agent avoids the bleeding by quickening the permeation speed such that the permeability of the water base ink for ink-jet recording of the present invention into the recording paper, which is obtained by the surfactant having the nitrogen atom, is assisted so that the drying performance on the paper surface is improved. The permeating agent is not specifically limited. However, it is preferable to use those which hardly cause the feathering (whisker-shaped blurring formed along the fiber of the paper) which would be otherwise caused during the permeation. Those preferably usable include, for example, polyvalent alcohol monoalkyl ether which has the low odor and which has the low vapor pressure. The polyvalent alcohol monoalkyl ether is not specifically limited, which may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the blending amount of the polyvalent alcohol monoalkyl ether is 3 to 15% by weight with respect to the total amount of the water base ink for ink-jet recording of the present invention. If the blending amount is less than 3% by weight, problems concerning the drying time and the blurring are caused in some cases, because the permeation speed of the ink into the recording paper is slow. If the blending amount exceeds 15% by weight, then the water base ink for ink-jet recording of the present invention arrives at the back side of the recording paper, and the blurring is caused in some cases, because the permeation speed of the ink into the recording paper is too fast.

When the water base ink for ink-jet recording of the present invention is applied to the ink-jet system in which the ink is discharged in accordance with the action of thermal energy, thermal physical values including, for example, the specific heat, the coefficient of thermal expansion, and coefficient of thermal conductivity may be adjusted.

The water base ink for ink-jet recording of the present invention has the surface tension of 30 to 50 mN/m by containing the surfactant having the nitrogen atom in the molecule. Owing to the surface tension of 30 to 50 mN/m, the water base ink for ink-jet recording of the present invention is excellent in the permeability into the recording objective material such as recording paper, and it is possible to perform the recording with the excellent printing quality without any blurring. If the surface tension is less than 30 mN/m, then the blurring occurs, and the printing quality is deteriorated. If the surface tension exceeds 50 mN/m, it is difficult to maintain the performance of introduction into the discharge head and the discharge stability.

In the water base ink for ink-jet recording of the present invention, the ratio of the change of the surface tension after the storage at 60° C. for 2 weeks is less than 5% by containing the compound represented by the formula (1). Owing to the fact that the ratio of the change of the surface tension after the storage at 60° C. for 2 weeks is less than 5%, the jetting operation can be performed stably over a long period of time, and it is possible to perform the high quality recording. If the ratio of the change of the surface tension after the storage at 60° C. for 2 weeks exceeds 5%, it can be judged that the time-dependent stability of ink characteristics required for the ink for ink-jet recording is insufficient. The ratio of the change of the surface tension can be determined in accordance with the following expression (4).

Ratio of change of surface tension={(value of surface tension before storage test)−(value of surface tension after storage test)}/(value of surface tension before storage)×100  (4)

The water base ink for ink-jet recording of the present invention contains the surfactant which has the nitrogen atom in the molecule. Accordingly, it is possible to perform the recording with the high quality while avoiding any blurring without deteriorating the discharge stability and the performance of introduction into the discharge head. The water base ink for ink-jet recording of the present invention further contains the compound which is represented by the formula (1). Accordingly, the dispersion stability of the contained particulate coloring agent is excellent, the surfactant having the nitrogen atom is prevented from the adsorption to the particulate coloring agent, and the time-dependent stability of the ink characteristics is excellent. Therefore, it is possible to perform the jetting operation stably over a long period of time, and it is possible to perform the high quality recording.

The method for preparing the water base ink for ink-jet recording of the present invention is not specifically limited. However, for example, those preferably usable include, for example, a method comprising manufacturing a preparation solution A by mixing the compound which is represented by the formula (1) and an aqueous coloring agent solution obtained by dispersing the self-dispersing type water-insoluble particulate coloring agent; manufacturing a preparation solution B by mixing materials for constituting the water base ink for ink-jet recording of the present invention except for the compound which is represented by the formula (1) and the self-dispersing type water-insoluble particulate coloring agent; and agitating the preparation solution A and adding the preparation solution B to the preparation solution A during the agitation, followed by being mixed with each other. Another one of those relevant to the present invention as well is a method for preparing the water base ink for ink-jet recording containing the self-dispersing type water-insoluble particulate coloring agent, the compound represented by the formula (1), the surfactant having the nitrogen atom in the molecule, the water, and the water-soluble organic solvent as described above; the method for preparing the water base ink for ink-jet recording comprising at least a step of manufacturing a preparation solution A by mixing the compound which is represented by the formula (1) and an aqueous coloring agent solution obtained by dispersing the self-dispersing type water-insoluble particulate coloring agent; a step of manufacturing a preparation solution B by mixing all constitutive materials except for the compound which is represented by the formula (1) and the self-dispersing type water-insoluble particulate coloring agent; and a step of agitating the preparation solution A and adding the preparation solution B to the preparation solution A during the agitation, followed by being mixed with each other. The coloring agent can be sufficiently coated with the compound in the preparation solution A beforehand by preparing the preparation solution A containing the coloring agent and the compound represented by the formula (1) as described above. Even when the preparation solution A and the preparation solution B are mixed with each other thereafter, the adsorption of the surfactant contained in the preparation solution B to the coloring agent is effectively avoided.

EXAMPLES

The present invention will be explained in further detail below as exemplified by Examples. However, the present invention is not limited to only Examples.

Example 1

Preparation of Water Base Ink for Ink-jet Recording

A preparation solution A1 was manufactured by mixing and agitating, for 3 hours, 33.3 parts by weight of a black pigment-dispersed aqueous solution (CAB-O-JET 300, solid content: 15% by weight, produced by Cabot), 1 part by weight of a compound represented by the formula (1) (LEVENOL WX, x=25, produced by Kao Corporation), and 20.0 parts by weight of pure water. Subsequently, a preparation solution B1 was manufactured by mixing and agitating, for 30 minutes, 19.1 parts by weight of pure water, 26 parts by weight of glycerol, 0.2 part by weight a surfactant represented by the formula (2) (ETHOMEEN C/15, y+z=5, produced by Lion Akzo Co., Ltd.), and 0.4 part by weight a surfactant represented by the formula (3) (Aromox DMC-W, produced by Lion Akzo Co., Ltd.). The preparation solution B1 was slowly added to the preparation solution A1 while slowly agitating the preparation solution A1. The agitation was performed for further 30 minutes, followed by being filtrated through a membrane filter of 0.8 μm to obtain a water base ink for ink-jet recording.

Example 2

Preparation of Water Base Ink for Ink-jet Recording

A preparation solution B2 was manufactured by mixing and agitating, for 30 minutes, 18.5 parts by weight of pure water, 26 parts by weight of glycerol, 1 part by weight of triethylene glycol monobutyl ether, and 0.2 part by weight a surfactant represented by the formula (2) (ETHOMEEN C/15, y+z=5, produced by Lion Akzo Co., Ltd.). The preparation solution B2 was slowly added to the preparation solution A1 manufactured in Example 1 while slowly agitating the preparation solution A1. The agitation was performed for further 30 minutes, followed by being filtrated through a membrane filter of 0.8 μm to obtain a water base ink for ink-jet recording.

Example 3

Preparation of Water Base Ink for Ink-jet Recording

A preparation solution B3 was manufactured by mixing and agitating, for 30 minutes, 16.8 parts by weight of pure water, 28 parts by weight of glycerol, 0.5 part by weight of dipropylene glycol monopropyl ether, and 0.4 part by weight a surfactant represented by the formula (3) (Aromox DMC-W, produced by Lion Akzo Co., Ltd.). The preparation solution B3 was slowly added to the preparation solution A1 manufactured in Example 1 while slowly agitating the preparation solution A1. The agitation was performed for further 30 minutes, followed by being filtrated through a membrane filter of 0.8 μm to obtain a water base ink for ink-jet recording.

Example 4

Preparation of Water Base Ink for Ink-jet Recording

A preparation solution A2 was manufactured by mixing and agitating, for 3 hours, 33.3 parts by weight of a black pigment-dispersed aqueous solution (CAB-O-JET 300, solid content: 15% by weight, produced by Cabot), 0.8 part by weight of a compound represented by the formula (1) (LATEMUL WX, x=23, produced by Kao Corporation), and 20.7 parts by weight of pure water. Subsequently, a preparation solution B4 was manufactured by mixing and agitating, for 30 minutes, 17.7 parts by weight of pure water, 26 parts by weight of glycerol, 2 parts by weight of triethylene glycol monobutyl ether, and 0.2 part by weight a surfactant represented by the chemical formula (2) (ETHOMEEN S/15, y+z=5, produced by Lion Akzo Co., Ltd.). The preparation solution B4 was slowly added to the preparation solution A2 while slowly agitating the preparation solution A2. The agitation was performed for further 30 minutes, followed by being filtrated through a membrane filter of 0.8 μm to obtain a water base ink for ink-jet recording.

Example 5

Preparation of Water Base Ink for Ink-jet Recording

A preparation solution A3 was manufactured by mixing and agitating, for 3 hours, 33.3 parts by weight of a black pigment-dispersed aqueous solution (CAB-O-JET 300, solid content: 15% by weight, produced by Cabot), 1.5 parts by weight of a compound represented by the formula (1) (LATEMUL WX, x=23, produced by Kao Corporation), and 20.0 parts by weight of pure water. Subsequently, a preparation solution B5 was manufactured by mixing and agitating, for 30 minutes, 19.4 parts by weight of pure water, 15 parts by weight of glycerol, 10 parts by weight of 1,5-pentanediol, 0.3 part by weight of dipropylene glycol monopropyl ether, and 0.5 part by weight a surfactant represented by the formula (3) (Aromox DM14D-N, produced by Lion Akzo Co., Ltd.). The preparation solution B5 was slowly added to the preparation solution A3 while slowly agitating the preparation solution A3. The agitation was performed for further 30 minutes, followed by being filtrated through a membrane filter of 0.8 μm to obtain a water base ink for ink-jet recording.

Comparative Example 1

Preparation of Water Base Ink for Ink-jet Recording

A preparation solution C1 was manufactured by mixing and agitating, for 3 hours, 33.3 parts by weight of a black pigment-dispersed aqueous solution (CAB-O-JET 300, solid content: 15% by weight, produced by Cabot) and 20.0 parts by weight of pure water. Subsequently, a preparation solution D1 was manufactured by mixing and agitating, for 30 minutes, 20.1 parts by weight of pure water, 26 parts by weight of glycerol, 0.2 part by weight a surfactant represented by the formula (2) (ETHOMEEN C/15, y+z=5, produced by Lion Akzo Co., Ltd.), and 0.4 part by weight a surfactant represented by the formula (3) (Aromox DMC-W, produced by Lion Akzo Co., Ltd.). The preparation solution D1 was slowly added to the preparation solution C1 while slowly agitating the preparation solution C1. The agitation was performed for further 30 minutes, followed by being filtrated through a membrane filter of 0.8 μm to obtain a water base ink for ink-jet recording.

Comparative Example 2

Preparation of Water Base Ink for Ink-jet Recording

A preparation solution D2 was manufactured by mixing and agitating, for 30 minutes, 20.5 parts by weight of pure water, 26 parts by weight of glycerol, 1 part by weight of triethylene glycol monobutyl ether, and 0.2 part by weight a surfactant represented by the formula (2) (ETHOMEEN C/15, y+z=5, produced by Lion Akzo Co., Ltd.). The preparation solution D2 was slowly added to the preparation solution C1 manufactured in Comparative Example 1 while slowly agitating the preparation solution C1. The agitation was performed for further 30 minutes, followed by being filtrated through a membrane filter of 0.8 μm to obtain a water base ink for ink-jet recording.

Comparative Example 3

Preparation of Water Base Ink for Ink-jet Recording

A preparation solution D3 was manufactured by mixing and agitating, for 30 minutes, 17.8 parts by weight of pure water, 28 parts by weight of glycerol, 0.5 part by weight of dipropylene glycol monopropyl ether, and 0.4 part by weight a surfactant represented by the formula (3) (Aromox DMC-W, produced by Lion Akzo Co., Ltd.). The preparation solution D3 was slowly added to the preparation solution C1 manufactured in Comparative Example 1 while slowly agitating the preparation solution C1. The agitation was performed for further 30 minutes, followed by being filtrated through a membrane filter of 0.8 μm to obtain a water base ink for ink-jet recording.

Comparative Example 4

Preparation of Water Base Ink for Ink-jet Recording

A preparation solution D4 was manufactured by mixing and agitating, for 30 minutes, 18.5 parts by weight of pure water, 26 parts by weight of glycerol, 2 parts by weight of triethylene glycol monobutyl ether, and 0.2 part by weight a surfactant represented by the formula (2) (ETHOMEEN S/15, y+z=5, produced by Lion Akzo Co., Ltd.). The preparation solution D4 was slowly added to the preparation solution C1 manufactured in Comparative Example 1 while slowly agitating the preparation solution C1. The agitation was performed for further 30 minutes, followed by being filtrated through a membrane filter of 0.8 μm to obtain a water base ink for ink-jet recording.

Comparative Example 5

Preparation of Water Base Ink for Ink-jet Recording

A preparation solution D5 was manufactured by mixing and agitating, for 30 minutes, 19.9 parts by weight of pure water, 15 parts by weight of glycerol, 10 parts by weight of 1,5-pentanediol, 0.3 part by weight of dipropylene glycol monopropyl ether, and 0.5 part by weight a surfactant represented by the chemical formula (3) (Aromox DM14D-N, produced by Lion Akzo Co., Ltd.). The preparation solution D5 was slowly added to the preparation solution C1 manufactured in Comparative Example 1 while slowly agitating the preparation solution C1. The agitation was performed for further 30 minutes, followed by being filtrated through a membrane filter of 0.8 μm to obtain a water base ink for ink-jet recording.

Evaluation

Evaluation of Stability of Surface Tension Value

A storage test was carried out at 60° C. for 2 weeks for each of the water base inks for ink-jet recording prepared in Examples 1 to 5 and Comparative Examples 1 to 5. The surface tension values were measured before and after the storage test. Results are shown in Table 1.

TABLE 1

| Ink | Surface tension value before storage test (mN/m) | Surface tension value after storage test (mN/m) | Ratio of change of surface tension (%) |
| --- | --- | --- | --- |
| Example 1 | 35.8 | 36.8 | 2.8 |
| Example 2 | 38.2 | 39.5 | 3.4 |
| Example 3 | 36.5 | 37.2 | 1.9 |
| Example 4 | 37.7 | 39.2 | 4.0 |
| Example 5 | 39.1 | 40.2 | 2.8 |
| Comp. Ex. 1 | 36.1 | 50.9 | 41.0 |
| Comp. Ex. 2 | 38.8 | 52.7 | 35.8 |
| Comp. Ex. 3 | 37.2 | 48.9 | 31.5 |
| Comp. Ex. 4 | 38.0 | 46.6 | 22.6 |
| Comp. Ex. 5 | 39.8 | 49.5 | 24.4 |

Evaluation of Printing Quality after Storage Test

A storage test was carried out at 60° C. for 2 weeks for each of the water base inks for ink-jet recording prepared in Examples 1 to 5 and Comparative Examples 1 to 5. The printing was performed on regular paper (XEROX 4200) before and after the storage test by using a recording apparatus having an on-demand type multi-head (discharge orifice diameter: 40 μm, driving voltage: 30 V, frequency: 10 kHz) for performing the recording by generating liquid droplets by applying the pressure brought about by the vibration of a piezoelectric element to the water base ink for ink-jet recording contained in the recording head. The bleeding and the banding were evaluated for obtained printed images in accordance with the following criteria. Results are shown in Table 2. The banding represents the degree of uniformity obtained when the solid printing with single color is performed. When the banding (white stripe) is absent, the solid printing with a uniform density is achieved. When the banding is present, then the portion of the solid printing is not filled sufficiently, and the portion is viewed as if any white stripe is added. +: Neither bleeding nor banding appeared. ±: Any one of the bleeding and the banding appeared. −: Both of the bleeding and the banding appeared.

TABLE 2

| Ink | Before storage test | After storage test |
| --- | --- | --- |
| Example 1 | + | + |
| Example 2 | + | + |
| Example 3 | + | + |
| Example 4 | + | + |
| Example 5 | + | + |
| Comp. Ex. 1 | + | − |
| Comp. Ex. 2 | + | − |
| Comp. Ex. 3 | + | − |
| Comp. Ex. 4 | + | − |
| Comp. Ex. 5 | + | − |

In each of the water base inks for ink-jet recording prepared in Examples 1 to 5, the change of the surface tension was small after the storage test at 60° C. for 2 weeks, and no deterioration of the printing quality was observed as well. On the other hand, each of the water base inks for ink-jet recording prepared in Comparative Examples 1 to 5 had problems in the evaluation of the stability of the surface tension value and in the evaluation of the printing quality after the storage test.

An embodiment of an ink cartridge which contains the ink in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet. The ink cartridge may be placed independent from the ink jet head. For example, the ink cartridge may be provided on the ink jet printer frame and be connected with the ink jet head by a flexible tube through which the ink is passed.

According to the present invention, it is possible to provide the water base ink for ink-jet recording which is excellent in the time-dependent stability of the ink characteristics, which can be stably jetted over a long period of time, and which makes it possible to perform the high quality recording.

What is claimed is:

1. A water base ink for ink-jet recording comprising:
water;
a water-soluble organic solvent;
a self-dispersing type water-insoluble particulate coloring agent;

a compound which is represented by the following formula (1);

wherein $R^1$ represents an alkyl group and x is 20 to 30 in the formula (1); and a surfactant which has a nitrogen atom in a molecule.

2. The water base ink for ink-jet recording according to claim 1, wherein the surfactant is at least one of a surfactant represented by the following formulae (2) and (3):

wherein $R^2$ represents an alkyl group and y+z is 5 to 15 in the formula (2);

wherein $R^3$ represents an alkyl group and N→O represents a semipolar bond of amine oxide in the formula (3).

3. The water base ink for ink-jet recording according to claim 1, wherein a surface tension is 30 to 50 mN/m, and a ratio of change of the surface tension after storage at 60° C. for 2 weeks is less than 5%.

4. The water base ink for ink-jet recording according to claim 1, wherein the compound represented by the formula (1) is sodium polyoxyethylene oleyl ether sulfate.

5. The water base ink for ink-jet recording according to claim 1, wherein the compound represented by the formula (1) is contained by 0.5 to 1% by weight in the ink.

6. The water base ink for ink-jet recording according to claim 1, wherein the surfactant is contained by 0.1 to 3% by weight in the ink.

7. An ink cartridge which accommodates the water base ink for ink-jet recording as defined in claim 1.

8. A method for preparing the water base ink for ink-jet recording as defined in claim 1, comprising the steps of:

preparing a solution A by mixing the compound which is represented by the formula (1) and an aqueous coloring agent solution obtained by dispersing the self-dispersing type water-insoluble particulate coloring agent;

preparing a solution B by mixing components for constituting the ink except for the compound represented by the formula (1) and the self-dispersing type water-insoluble particulate coloring agent; and agitating the solution A and adding the solution B to the solution A during the agitation, followed by being mixed with each other.

9. The method for preparing the water base ink for ink-jet recording according to claim 8, wherein the surfactant is at least one of a surfactant represented by the following formulae (2) and (3):

wherein $R^2$ represents an alkyl group and y+z is 5 to 15 in the formula (2);

wherein $R^3$ represents an alkyl group and N→O represents a semipolar bond of amine oxide in the formula (3).

10. The method for preparing the water base ink for ink-jet recording according to claim 8, wherein the compound represented by the formula (1) is sodium polyoxyethylene oleyl ether sulfate.

11. The method for preparing the water base ink for ink-jet recording according to claim 8, wherein the solution A is prepared so that the compound represented by the formula (1) is contained by 0.5 to 1% by weight in the ink.

12. The method for preparing the water base ink for ink-jet recording according to claim 8, wherein the solution B is prepared so that the surfactant is contained by 0.1 to 3% by weight in the ink.

* * * * *